Patented Feb. 21, 1933

1,898,839

UNITED STATES PATENT OFFICE

LUDWIG KERN, OF WEBSTER GROVES, MISSOURI

PROCESS OF MANUFACTURING POROUS SILICA WARE

No Drawing.   Application filed June 18, 1930.  Serial No. 462,120.

This invention relates to porous, acid-resisting ceramic products, and with regard to certain more specific features, to porous silica ware.

Among the several objects of the invention may be noted the provision of a process for manufacturing ceramic products of the class described from widely-occurring natural silica substances such as sand, quartz, tripoli and the like; a process of the class described which necessitates no temperatures high enough to fuse the silica; a process of the class described which is economical to carry out and which uses only raw materials of common occurrence; and the provision of an acid-proof silica ware product which is hard and wear- or abrasion-resisting, yet sufficiently porous to permit of gas filtration and the like. Other objects will be in part obvious and in part pointed out hereinafter.

The invention accordingly comprises the elements and combinations of elements, steps and sequence of steps and features of synthesis which will be exemplified in the description hereinafter and the scope of the application of which will be indicated in the following claims.

I have found that certain types of silica which occur in aggregate or crystalline form, as, for example, quartz, can be reduced to an amorphous powder by heating said silica to a disintegration temperature where the crystalline structure is partially destroyed, and then immediately shock-chilling the hot silica by immersing it in cold water or the like. For heating purposes, I have found an ordinary rotary cement calciner or kiln to be suitable. The disintegration temperature is of the order of 1300° to 1500° C.

The pulverized or disintegrated amorphous silica powder so formed is utilized in the formation of porous acid-resisting ceramic products in the following manner:

The pulverized amorphous silica powder is thoroughly mixed with finely comminuted combustible material, such as coal, lignite, wood, and the like. The raw silica may vary from 80 to 99.5 per cent of the total. The mixture is then homogenized with a plasticizing agent such as a hydrochloric acid or a chloride or chloride solution, for example, a magnesium chloride solution, or alkaline solutions, such as, for example, sodium hydroxide solutions.

The continued homogenizing forms the silica-combustible material into a moldable, plastic, doughy mass. This plastic mass may then be suitably shaped, as, for example, into briquettes or pipes. The shapes are allowed to dry, and then fired or burned in an open fire tunnel kiln or the like. The burning temperature is gradually brought to the order of 1500° C.

During the burning, large quantities of hydrocarbon vapors are evolved and may be collected and condensed. Subsequent to the vapor evolution, the coke or char remaining in the product is burned to carbon dioxide.

The burning of the combustible particles, and the evolution of hydrocarbons, combine to effect a porosity in the silica residue, which is at the time in a semi-fused condition readily permeable to gases. The final, highest temperature of burning should not exceed the temperature of incipient fusion of the silica, so that fusion will not destroy the porosity created in the above manner.

Subsequently to the burning, the shapes are slowly cooled and/or annealed. The resulting product is silica in a hard, strong, although highly porous condition. The acid-proof qualities of silica are well known. The unusual homogeneity and porosity of the product are features predicated upon the use of pulverized amorphous silica in the mixture, in place of the crystalline silica heretofore employed. Silica in the amorphous condition is far more readily susceptible to proper and complete plasticizing, and thus articles are obtained prior and subsequent to firing which are not only more homogeneous, but are also firmer and more capable of accurate, sharp molding.

It is to be understood that any comminutable combustible substance may be used in place of the coal, lignite, and wood described.

In view of the foregoing, it will be seen that the several objects of the invention are achieved and other advantageous results attained.

As many changes could be made in carrying out the above objects without departing from the scope of the invention, it is intended that all matter contained in the above description shall be interpreted as illustrative and not in a limiting sense.

I claim:

1. The process of manufacturing porous silica ware which comprises disintegrating naturally occurring crystalline silica materials to an amorphous condition, said disintegration being accomplished by heating said natural silica material and suddenly cooling the same, mixing said amorphous silica with solid combustible material, plasticizing the mixture, shaping the plasticized mixture, and burning the combustible material from the shapes.

2. The process of manufacturing porous silica ware which comprises disintegrating naturally occurring crystalline silica materials to an amorphous condition, said disintegration being accomplished by heating said natural silica material and suddenly cooling the same, combining with said amorphous silica a portion of comminuted solid combustible material, homogenizing the mixture with a plasticizing agent whereby the entire mass is rendered plastic, forming the plastic mass into shapes, and firing said shapes to a temperature sufficient to burn substantially all of the combustible material therefrom.

3. The process of manufacturing porous silica ware which comprises disintegrating naturally occurring crystalline silica materials to an amorphous condition, said disintegration being accomplished by heating said natural silica material and suddenly cooling the same, combining with said amorphous silica a portion of comminuted solid combustible material, homogenizing the mixture with hydrochloric acid whereby the entire mass is rendered plastic, forming the plastic mass into shapes, and firing said shapes to a temperature sufficient to burn substantially all of the combustible material therefrom.

4. The process of manufacturing porous silica ware which comprises disintegrating naturally occurring crystalline silica materials to an amorphous condition, said disintegration being accomplished by heating said natural silica material and suddenly cooling the same, combining with said amorphous silica a portion of comminuted solid combustible material, homogenizing the mixture with chlorides whereby the entire mass is rendered plastic, forming the plastic mass into shapes, and firing said shapes to a temperature sufficient to burn substantially all of the combustible material therefrom.

5. The process of manufacturing porous silica ware which comprises disintegrating naturally occurring crystalline silica materials to an amorphous condition, said disintegration being accomplished by heating said natural silica material and suddenly cooling the same, combining with said amorphous silica a portion of comminuted solid combustible material, homogenizing the mixture with alkaline solutions whereby the entire mass is rendered plastic, forming the plastic mass into shapes, and firing said shapes to a temperature sufficient to burn substantially all of the combustible material therefrom.

In testimony whereof, I have signed my name to this specification this 13th day of June, 1930.

LUDWIG KERN.